United States Patent [19]

Yajima et al.

[11] 4,272,287

[45] Jun. 9, 1981

[54] PROCESS FOR REFINING MOLTEN STEEL CONTAINING CHROMIUM

[75] Inventors: Tadamasa Yajima, Nagoya; Shuzo Kitagawa, Aichi; Hiromi Hata, Chita, all of Japan

[73] Assignee: Daido Tokushuko Kabushiki Kaisha, Aichi, Japan

[21] Appl. No.: 147,558

[22] Filed: May 8, 1980

[30] Foreign Application Priority Data

May 29, 1979 [JP] Japan ............................. 54-66487

[51] Int. Cl.³ .............................................. C21C 7/02
[52] U.S. Cl. ............................................ 75/60; 75/59
[58] Field of Search ................................. 75/60, 59

[56] References Cited

U.S. PATENT DOCUMENTS

| | | | |
|---|---|---|---|
| 3,854,932 | 12/1974 | Bishop | 75/60 |
| 3,953,199 | 4/1976 | Michaelis | 75/59 |
| 3,997,335 | 12/1976 | Kolb | 75/59 |

*Primary Examiner*—P. D. Rosenberg
*Attorney, Agent, or Firm*—Browdy & Neimark

[57] ABSTRACT

A chromium-containing steel refining process which is employed in a decarburizing refining of chromium-containing steel includes a step of blowing oxygen and inert gas below the upper surface level of molten steel for performing decarburizing reaction there, and a step of blowing oxygen-containing gas above the upper surface level of the molten steel, for the purpose of burning carbon monoxide gas produced from the upper surface of the molten steel, which oxygen-containing gas includes therein oxygen at least 0.2 times as much as the amount of the oxygen blown below the upper surface level of the molten steel.

7 Claims, 4 Drawing Figures

PROCESS FOR REFINING MOLTEN STEEL CONTAINING CHROMIUM

FIELD OF THE INVENTION

This invention relates to a process for refining molten steel containing chromium such as stainless steel.

BACKGROUND OF THE INVENTION

In the ordinary decarburization method in which oxygen is blown into molten steel, the resulting reaction product carbon monoxide (CO), produced by the decarburizing reaction in accordance with the following formula (1), is a so-called incomplete combustion product wherein the heat of chemical reaction that carbon (C) as a fuel possesses is actually utilized to the extent of at most one third of the maximum:

$$C + \tfrac{1}{2}O_2 = CO + 26.4 \; Kcal/mol \tag{1}$$

In a case wherein C is satisfactorily burnt, i.e., good combustion takes place as shown in the following formula (2), to produce carbon dioxide ($CO_2$), the reaction heat produced there reaches as much as 94.05 kcal/mol:

$$C + O_2 = CO_2 + 94.05 \; kcal/mol \tag{2}$$

The effective recovery of the heat of chemical reaction concealed in this CO, that is latently held therein, for utilizing it positively has been attempted for many years by many persons. The Kaldo process and the Rotor process, which are employed in refining pig iron into plain carbon steel, out of those many propositions, adopt a method of blowing oxygen into the furnace in order to directly burn the CO in question. Another method is to lead the CO out of the furnace for recovering and utilizing it, such as by the recovery of exhaust gas in a converter. In the former two methods, wherein combustion takes place inside the furnace, the furnace body must be turned or rotated, and the heat generated when CO is converted to $CO_2$ must be stored in the furnace wall for transmittal to the molten steel indirectly. These methods are consequently obliged to suffer some disadvantages enumerated as follows, and they are therefore regarded at present as being obsolete:

(1) a huge driving apparatus must be installed for turning the converter, or a revolving furnace body must be provided, and (2) vibration of the furnace body occurring when it is turned, and exposure of the furnace wall to high temperature greatly increases the wear of refractories in the furnace.

For the refining of special steels such as stainless steel which contains chromium, an extremely low percentage of carbon, for example 0.01% is required, in comparison to plain carbon steel where as high a percentage of carbon as 0.45% is allowed. Thorough decarburization to the molten steel which is obtained in an electric furnace, etc., must be carried out in the refining of stainless steel. According to general belief, the oxygen blown into the bottom of a furnace in the decarburization of such chromium-containing steel is first turned to an oxide, for example of chromium, before being finally converted to CO according to the process shown in the formula (3):

$$3Cr + 2O_2 \rightarrow Cr_3O_4$$

$$Cr_3O_4 + 4C \rightarrow 3Cr + 4CO \tag{3}$$

As a method effectively functioning in such a decarburization system for molten steel, a type called the AOD (Argon Oxygen Decarburization) process has been developed and practiced in recent years, wherein a gas mixture of argon (Ar) and oxygen ($O_2$) is blown from below into the upper surface level of the molten steel. This type of method is problematical, irrespective of its feature of accelerating decarburization by restraining oxidizing of chromium, in increasing the wear of the tuyere due to blowing of the oxygen-containing gas therethrough and incapability of speeding-up the oxygen supply even at a peak of decarburizing action. As a substitute for this AOD process, another process called "Oxygen top-blowing—Argon bottom-blowing" was developed, wherein $O_2$ and Ar are respectively blown from individually separated sources, the former being blown into the upper surface level of the molten steel and the latter below the upper surface level thereof. This process was recognized to be as effective as the previous AOD process in the refining of steel. Both of those two processes are effective, however, only in turning C to CO, but still unsatisfactory in the utilization of the heat of chemical reaction according to the following formula (4):

$$CO + \tfrac{1}{2}O_2 = CO_2 \; 30 \; 67.7 \; kcal/mol \tag{4}$$

In such processes wherein C is turned CO by way of oxides of chromium, residue of the oxides of chromium forms slag floating on the surface of the molten steel. Throwing away of such slag is disadvantageous not only in varying to chromium content in the finished steel, but also in increasing loss of precious chromium. For preventing this disadvantage, addition of silicon (Si), a reducing agent for the slag, has been practiced. Then the chromium can be returned to the molten steel according to the following chemical reaction shown in the formula (5).

$$2Si + Cr_3O_4 \rightarrow 2SiO_2 + 3Cr \tag{5}$$

Such addition of Si is effective indeed in returning the chromium again into the molten steel, so economically preventing loss of chromium, but the Si is obliged to thrown away with the slag as an inevitable loss. It is therefore highly desirable to minimize the amount of the Si added in the refining process, as a matter of course.

SUMMARY OF THE INVENTION

This invention was made from such a background. It is therefore a primary object of this invention to provide an improved refining process for chromium-containing steel such as stainless steel.

Another object of this invention is to provide an improved refining process wherein energy saving is attained by effectively enhancing the thermal efficiency through utilizing the exothermic energy coming from the chemical reaction which takes place in a refining process of decarburization of chromium-containing steel, enhancement of decarburization rate and extent of decarburizing effect is attained, and the reduction of consumption of the silicon (Si) inevitably added in the refining process of decarburization of chromium-containing steel as a reducing agent for the slag can be achieved to the greatest possible extent.

Other objects of this invention will be apparent to those skilled in the art from the detailed description of the preferred embodiments when read in connection with the accompanying drawings.

This invention attempts to realize, for the purpose of attaining the above-mentioned objects, the below-mentioned processes, that is to say: while oxygen and inert gas are being blown into the molten steel under the surface thereof, i.e., below the upper surface level thereof, an oxygen-containing gas, which contains therein oxygen at least 0.2 times as much as the amount of oxygen blown below the upper surface level of the molten steel, is blown over the surface of, i.e., above the upper surface level of, the molten steel for burning the carbon monoxide (CO) produced from the upper surface of the molten steel; the CO gas produced as a result of decarburization in the molten steel by the oxygen blown into the molten steel is turned to $CO_2$ due to the oxygen blown over the surface of the molten steel; the exothermic energy generated in the combustion is utilized by the diffusion or transmission thereof into the turbulent molten steel violently stirred by the blowing of the oxygen and the inert gas; the temperature of the molten steel is thereby advantageously raised to lead to more favorable decarburizing; and moreover, the decarburization reaction between carbon and oxides of metals contained in the molten steel in the exposed part below a high temperature atmosphere or space over the surface of the molten steel is advantageously carried out in such a manner as indicated in the formula (3) as a process progressing from the left side to the right side thereof.

DETAILED DESCRIPTION OF THE PREFERRED EMBODIMENTS

Figure 1:
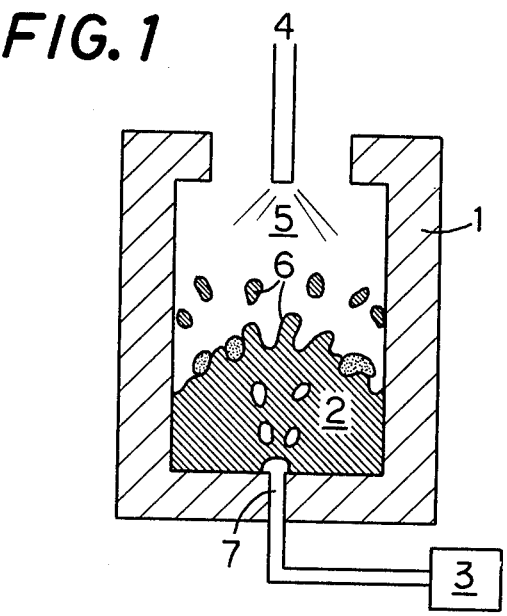
FIGS. 1 and 2 are respectively a schematic vertical sectional view of a refining furnace for explaining the process in accordance with this invention.

According to the refining process of this invention, molten steel 2, which is usually obtained in an electric furnace or the like, is decarburized by the later described gas in a reaction container 1 or vessel, having an upper blowing lance 4 and a lower blowing lance 7, as shown in FIG. 1, which are respectively located above the upper surface of and below the surface level of the molten steel. Then carbon monoxide (CO) gas produced as a product of the decarburizing reaction is burnt in an open high temperature space 5 over the surface level of the molten steel by oxygen ($O_2$) gas blown thereinto through the upper lance 4 to be turned to carbon dioxide ($CO_2$) (see the formula (4); the exothermic energy due to the heat of reaction is transmitted to splashes flying around caused by blowing of the oxygen and inert gas through the lower lance 7 and to the turbulent molten steel 2 stirred by the blown gas above-mentioned, with a result of enhancing the thermal efficiency due to the diffusion of the heat produced; a high temperature space 5 created by the combustion of CO gas to $CO_2$ gas is helpful in promoting the action between the carbon (C) and oxides, for example particles of chromium oxides or the slag mainly containing such oxides, in the molten steel 2 exposed to the high temperature space 5, one instance of such reaction being indicated in the formula (3) progressing from the left side to the right side; the combustion energy of the carbon (C) can be in this way utilized highly effectively for remarkably enhancing the thermal efficiency in the refining process, and the decarburizing reaction can be promoted due to the prevention of producing chromium oxides, and effective decrease of the silicon (Si) amount consumed per unit of the steel material can be achieved.

This invention is highly characterized in, unlike a case of a converter wherein the furnace body is rotated or turned around, that the heat produced during the burning process from carbon monoxide to carbon dioxide (CO→$CO_2$) is directly diffused or transmitted to the molten steel due to the violent stirring thereof through the blowing of the inert gas accompanied by the oxygen ($O_2$) gas sent into the molten steel under the surface level thereof, and this heat diffusion or transmission is relatively easily attainable by blowing the oxygen gas from the upper side against the direction of the CO gas stream coming from beneath the upper surface of the molten steel.

As a by-merit of the process effective restraining of the wear of refractories lining the interior of the furnace or the molten steel container can be enumerated. Because of the violent stirring of the molten steel abovementioned the refractories are incessantly washed by the molten steel or the slag instead of being constantly damaged by the high temperature atmosphere formed there by the combustion.

In the decarburization refining of chromium-containing steel, the higher the refining temperature is, the more depressed the oxidizing rate of chromium (Cr) and the more rapidly promoted the oxidizing rate of the carbon (C), as well-known in the temperature equilibrium diagram of [C]—[Cr]. This invention is therefore remarkably characterized in taking advantage of the above-mentioned principle, unlike the conventional way wherein the molten steel bath is heated only to raise the heat of the bath, that is to say, the low temperature steel or slag is stirred in the high temperature space or atmosphere 5 (for example 2,000° C.) formed by the conversion of CO→$C0_2$ which is carried out due to the top-blowing of the oxygen ($O_2$) gas above the surface level of the molten steel, and an effective transition from the left side of the formula (3) to the right side thereof is performed just in the process of the aforementioned heat diffusion or transmission.

In other words, the high temperature atmosphere 5 or space is formed above the surface level of the molten steel by completely burning the carbon monoxide (CO) produced in the vessel (furnace) to convert it to carbon dioxide ($CO_2$), and the exothermic energy generated by the violent flying about of the molten steel and the slag in the high temperature atmosphere 5 can be effectively diffused to the molten steel 2, which causes the temperature to rise of the molten steel 2 exposed to or in contact with the high temperature atmosphere 5. The reaction indicated in the formula (3) is carried out or promoted under such circumstances. When the temperature of molten steel is increased, the level of chromium percentage to be in equilibrium with the same level of carbon percentage is raised, which means oxidizing of chromium is restrained with the rise of the temperature. It is presumed in this invention that the amount of oxides of metals such as chromium oxides in the molten steel is effectively reduced, resulting in the decrease of the reducing agent amount, such as silicon (Si) required. It allows an assumption that the effective decrease of the amount of reducing agent Si used per unit of the material steel has been realized by virtue of this invention, to the greatest surprise.

By applying this invention the starting temperature of refining can be lowered, and the charging amount of coolant can be increased to the contrary. It means the amount of electric power required can be reduced per unit of the material steel. By way of example, while the power consumption in the conventional AOD was 480 KWH/scrap charge ton, it could be reduced to 408 KWH/scrap charge ton in an experiment in this invention.

For enjoying the merit of this invention to the greatest possible extent, it is required to determine the amount of oxygen for the top-blowing (x: the amount of oxygen blown above the surface level of the molten steel) at 0.2 times as much as the amount of oxygen for the bottom-blowing (y: the amount of oxygen blown below the surface level of the molten steel) at the least, that is $x \geq 0.2\ y$. The amount of oxygen for the top-blowing below or short of this limit is unsatisfactory for attaining the object of this invention, and the upper limit of the amount of oxygen used for this purpose is desirable to be determined at about 1.2 times as much as the oxygen for the bottom-blowing, that is $x \geq 1.2\ y$, from the consideration of the effect to the temperature rising rate and the decarburization rate as well as the economy. An extreme increasing of the oxygen amount for the top-blowing does not allow expectance to the proportional increase of temperature rising rate and decarburization rate. The amount of the top-blowing gas is generally preferable to be at least 0.1 $Nm^3$/min per 1 ton of the molten steel.

Figure 2:
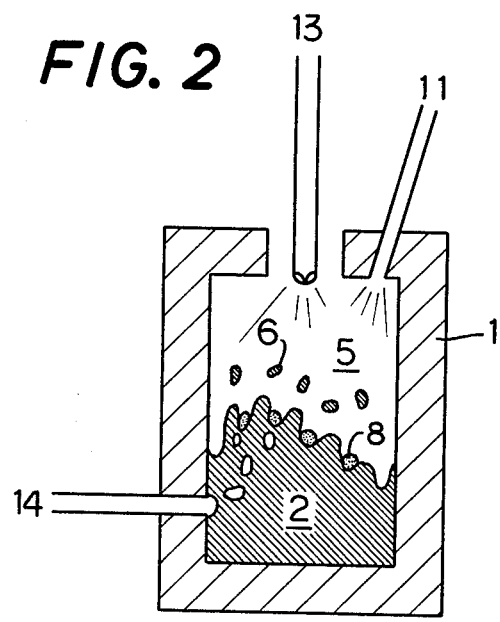

As the method of blowing oxygen from top, in addition to one illustrated in FIG. 1, some others are possible such as a lance (blowing inlet) fixed at a position in the furnace wall like the lance 11 in FIG. 2, or a nozzle type lance 13 in FIG. 2 which blows oxygen radially. As to the oxygen-containing gas used as top blowing gas in this case pure oxygen (100% oxygen) is most preferable, but it does not exclude a mixed gas with other gases, including inert gases, so long as it contains the oxygen of aforementioned rate ($x \geq 0.2\ y$). However, the concentration of the oxygen is desired in this case to be maintained at least 50%. As to the blowing method of oxygen and inert gas (Ar is generally recognized to be preferable) into below the surface level of the molten steel 2, various known ones with the name of AOD process are passable. For example, forming the blowing inlet 7 in the bottom wall of a furnace as 14 in FIG. 1, forming the inlet in the side wall as in FIG. 2, a method wherein oxygen and inert gas are blown individually or together mixed beforehand, or another method wherein oxygen and inert gas are led through a double pipe having an inner pipe and an outer pipe as far as the blowing inlet to be blown there together are all good. Besides, the oxygen used in this case must be limited in its amount not to incur the wear of the furnace wall which is already acknowledged generally in the AOD process. The oxygen content in the bottom-blowing gas is preferable to be maintained at least 50%.

Steels taken up as an object of refining of this invention usually contain chromium at various levels. The ones containing chromium at a ratio not less than 4% are considered preferable in applying the process in accordance with this invention. The greater the chromium content is in the steel, the more effectively applicable this process is.

Under-mentioned examples are disclosed for making the invention more clearly understood. It goes therefore without saying that this invention is never limited to them at all by this exemplification.

EXAMPLE 1

The experiment was conducted under the following conditions and purposes.

| Steel: molten steel containing 18% Cr and 8% Ni (SUS304) 20 ton | |
|---|---|
| Top-blowing gas: (blown above the level) | oxygen ($O_2$) was varied in many ways in its amount |
| Bottom-blowing gas: (blown below the level) | argon (Ar) and oxygen ($O_2$) Common condition |
| | Ar 0.3 $Nm^3$/min . ton |
| | $O_2$ 1.0 $Nm^3$/min . ton |
| | Starting temperature of the bottom blowing 1,500° C. |

Figure 3:
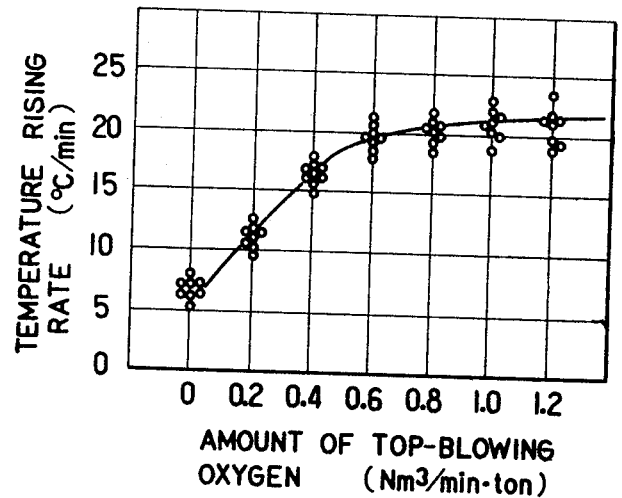
FIGS. 3 and 4 are respectively a graph showing the relation of temperature rising rate and decarburizing rate in response to the variation of top-blowing oxygen amount observed in Example 1.
Figure 4:
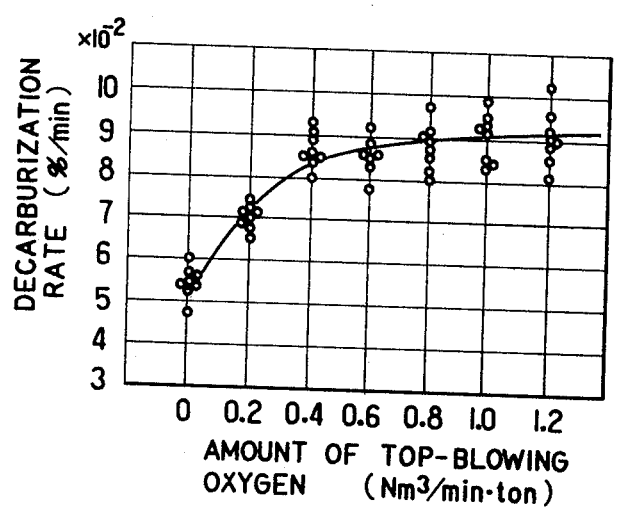

In the decarburization refining experiments temperature rising rate (°C./min) and decarburization rate (%/min) were plotted in accordance with the variation of conditions as shown in FIGS. 3 and 4.

As can clearly be seen in FIG. 3, the result of the experiments show that according to the increase of the blowing amount of top-blowing oxygen ($O_2$), the temperature rising rate was rapidly accelerated.

In comparison of a case when the top-blowing amount was 0.40 $Nm^3$/min.ton with a case when the top-blowing amount was zero, i.e., 0 $Nm^3$/min.ton, the temperature rising rate was greater by 2.4 times, reaching 17° C./min (see FIG. 3). The decarburization rate was recorded with an increase by 1.6 times at the top-blowing amount of oxygen 0.4 $Nm^3$/min.ton, reaching 0.085%/min (see FIG. 4).

As can be understood from the above statement, the temperature rising speed was increased by far larger rate than the increasing rate of the decarburization speed. This result shows that the combustion of CO→$CO_2$ takes place in the method of this invention and the resulting combustion heat is effectively utilized. Moreover, the amount of the silicon (Si) used, per unit of the steel, for reducing the slag was reduced from 13.2 Kg/ton to 9.0 Kg/ton in comparison between a case of the top-blowing oxygen 0.4 $Nm^3$/min.ton and a case of non-top blowing.

EXAMPLE 2

Comparing experiments among three cases are shown in Table 1:

| | |
|---|---|
| (a) | conventional AOD process (bottom-blowing with Ar and $O_2$) |
| (b) | a case of top-blowing with $O_2$ and bottom-blowing with Ar |
| (c) | this invention process wherein { top-blowing with $O_2$ / bottom-blowing with $O_2$ and Ar |
| In the experiment 1 wherein austenite SUS was treated: | |
| AOD process | $O_2$: 60 $m^3$/min  Ar: 20 $m^3$/min    and |
| $O_2$ top } process Ar bottom | $O_2$: 100 $m^3$/min  Ar: 13 $m^3$/min |

It was observed in a 70 ton furnace.

In experiment II, the present process and the AOD process were observed. All of the conditions used in the experiment I were adopted in this case, too.

upper surface level is determined at 1.2 time as much as the oxygen amount blown below said upper surface level.

TABLE 1

| | Experiment I | | | Experiment II | | |
|---|---|---|---|---|---|---|
| | (a) AOD process | (b) $O_2$ top-Ar bottom process | Rising ratio $\frac{(b)-(a)}{(a)} \times 100\%$ | (a) AOD process | (c) This invention | Rising ratio $\frac{(c)-(a)}{(a)} \times 100\%$ |
| Decarburization rate (%/min) | 0.035 | 0.060 | 71 | 0.055 | 0.085 | 55 |
| Temperature rising rate (°C./min) | 17.2 | 30.0 | 74 | 7.0 | 17.0 | 143 |
| Si consumption (Kg/ton) | 11.4 | 10.2 | — | 13.2 | 9.0 | — |

Table 1 shows that the superiority of the $O_2$ top-Ar bottom process to the AOD process was 71% in decarburization rate and 74% in temperature rising rate, which means that mere changing of bottom-blowing of $O_2$ to top-blowing $O_2$ ($O_2$ top-Ar bottom) was scarcely helpful in the complete combustion of CO to $CO_2$. It is a matter of course, therefore, that Si as a reducing agent can not be decreased. Actually the silicon amount was 11.4 Kg/ton in the AOD process and 10.2 Kg/ton in $O_2$ top-Ar bottom process, being scarcely significant.

In the comparison between this invention and AOD process, the increase of the decarburization rate was 55% while that of the temperature rising rate was 143%. It proves the taking place of complete combustion of the CO into $CO_2$ and the silicon amount consumed per unit of the steel was also remarkably decreased.

What is claimed is:

1. Decarburizing refining process for chromium-containing steel comprising steps of:
   performing decarburizing reaction and creating turbulence by means of blowing oxygen and inert gas into molten steel in a furnace below the upper surface level thereof;
   performing combustion of carbon monoxide (CO) gas produced from the upper surface of the molten steel by means of blowing above said upper surface level oxygen-containing gas including therein oxygen at least 0.2 times as much as the amount of the oxygen blown below said upper surface level, to convert said carbon monoxide (CO) gas, produced as a product of decarburization reaction caused by the oxygen blown below said upper surface level, into carbon dioxide ($CO_2$) gas by the oxygen-containing gas blown above said upper surface level;
   diffusing exothermic energy, produced by the conversion of carbon monoxide to carbon dioxide, into the molten steel through the violent turbulent stirring thereof caused by the blowing of the oxygen and the inert gas into the molten steel below said upper surface level for raising thereby the temperature of the molten steel; and
   promoting the decarburization reaction taking place, in a high temperature gaseous atmosphere formed above said upper surface level, between carbon contained in the molten steel exposed to said high temperature gaseous atmosphere and metallic oxides such as oxide of chromium.

2. The refining process claimed in claim 1, wherein the upper limit of the oxygen amount blown above said upper surface level is determined at 1.2 time as much as the oxygen amount blown below said upper surface level.

3. The refining process claimed in claim 1, wherein said oxygen-containing gas blown above said upper surface level consists of oxygen occupying at least 50% by volume and the balance being inert gas.

4. The refining process claimed in claim 1, wherein a reducing agent is added in said molten steel for reducing oxides such as those of chromium existing in said molten steel, which have been heated to a high temperature by the heat of reaction produced by the oxidation of said carbon monoxide into said carbon dioxide.

5. The refining process claimed in claim 1, wherein said chromium-containing steel is stainless steel.

6. The refining process claimed in claim 1, wherein said oxygen-containing gas is pure oxygen.

7. A process of decarburizing and refining molten steel containing at least 4% chromium, comprising:
   blowing into said molten chromium-containing steel from below the upper surface thereof a mixture of at least 50% oxygen with an inert gas, the quantity of oxygen being sufficient to effect a decarburizing reaction in the molten steel and the rate of blowing being sufficient to create a violent turbulent stirring of the molten steel;
   blowing onto the upper surface of said molten chromium-containing steel an oxygen-containing gas containing a quantity of oxygen of 0.2–1.2 times as great as the quantity of oxygen blown into said molten steel beneath the upper surface thereof, said oxygen-containing gas being blown onto the surface of said molten steel being sufficient to perform combustion of carbon monoxide gas produced from the upper surface of the molten steel to convert said carbon monoxide gas, produced as a product of decarburization, into carbon dioxide;
   diffusing exothermic energy, produced by said conversion of carbon monoxide to carbon dioxide, into the molten steel through the action of said violent turbulent stirring caused by the blowing of the oxygen and the inert gas into the molten steel below the upper surface thereof, to thereby raise the temperature of the molten chromium-containing steel; and
   thereby promoting the decarburization reaction taking place, in a high temperature gaseous atmosphere above the upper surface level of the molten steel, between carbon contained in the molten steel exposed to said high temperature gaseous atmosphere and metallic oxides including chromium oxide.

* * * * *